Dec. 25, 1956 L. J. PERAS 2,775,129
ADJUSTABLE CONTROL DEVICE WITH TIMING SYSTEM
Filed July 7, 1954 3 Sheets-Sheet 3

United States Patent Office 2,775,129
Patented Dec. 25, 1956

2,775,129

ADJUSTABLE CONTROL DEVICE WITH TIMING SYSTEM

Lucien Jules Peras, Billancourt, France, assignor to Regie Nationale des Usines Renault, Billancourt, France, French Works under the Control and the Authority of the French Government Application July 7, 1954, Serial No. 441,826

Claims priority, application France August 5, 1953

4 Claims. (Cl. 74—125.5)

This invention relates in general to adjustable control devices with timing systems and more particularly to an adjustment and timing arrangement for periodically operating a mechanism according to a predetermined timing sequence or rate.

Certain workshop machines, notably power presses, are driven through a crank-and-rod mechanism associated with a flywheel and the machine power is dependent on the mass and velocity of rotation of the flywheel. In machines of this type, the crank-and-rod mechanism may be driven continuously by the flywheel and this mode of operation is sometimes called "throw running" or "racing operation."

However, in many cases, this "throw running" is not consistent with the rate of cycle operations which is required for given working conditions. Thus, in mechanical or power presses, the operator is frequently unable to keep pace with the too fast rate of operation of the machine as he is unable to position a blank between two successive strokes of the slide. Similarly, the automatic blank feeding is not always consistent with the continuous operation of the press, notably when the blank-feeding mechanism is not connected through positive driving means to the crank-and-rod mechanism of the machine.

Therefore, the rate of operation of the press must be reduced but obviously the flywheel velocity cannot be acted upon, otherwise a material loss of power would result. The conventional solution consists in operating the slide stroke by stroke with the flywheel rotating continuously, the operator controlling for this purpose a clutch for operatively connecting the flywheel with the crank-and-rod mechanism.

This procedure is impractical in that the operator is compelled to act continuously on control levers or pedals, and subject to an additional source of fatigue likely to reduce the rate of production of the machine.

Now it is the essential object of this invention to provide a novel adjustment device associated with a timing system for a machine of the type indicated, whereby the desired or proper rate of operation of the machine may be selected at will, the operator's work consisting only in starting and stopping the automatically-timed running of the machine. Besides, the energy developed by the driving members of the machine remains unchanged.

Considering the specific case of power presses, two modes of operation should be considered, according to the type of clutch with which the adjustment device of this invention is to be associated:

(a) In the case of friction-clutch controlled power presses, the adjustment device makes it possible to calculate rates of slide strokes which are equal to the time required for a complete cycle of operation of the crank-and-rod mechanism plus a pause of any desired duration.

(b) If the press is equipped with a positive clutch either of the type comprising a rotating pin having a plurality of positions or of the dog type, the adjustment device may be set for determining rates of operation equivalent to the time required for a complete cycle of operation of the crank-and-rod mechanism plus a fraction $$\frac{1}{n}$$

of this time, $n$ denoting for example the number of possible positions of the rotating pin. Thus, if the clutch is provided with four spaced recesses adapted to be engaged by the pin, the rate of operation may vary by one-fourth of revolution of the clutch.

According to this invention, the adjustment device comprises essentially a mechanical, electric or electronic timing device actuating a valve, the clutch being operated whenever a fluid is admitted through this valve. The assembly is so arranged that when the operator depresses a pedal or other control member the timing device controls automatically the operation of the machine at predetermined intervals, until the pedal or other control member is released.

With this arrangement, the effort required from the operator for operating the clutch during the "stroke-by-stroke" operation of the machine is suppressed completely, whilst the rate of operation is constantly adjustable to meet the specific requirements of the works to be made.

According to a preferred form of embodiment of the invention which is particularly adapted for fast rates of operation, the adjustment device comprises an electronic timing arrangement. In this embodiment the coil of a solenoid controlling the clutch is inserted in the anode circuit of an electron tube having its grid connected to the anode circuit of another tube of which the conducting or non-conducting condition, combined with the discharge of a capacitor through a potentiometric adjustment, will block or release the tube connected in series with the solenoid coil, whereby the clutch will be actuated periodically. The rate of operation of the clutch is determined through the potentiometric adjustment.

The attached drawings, forming part of this specification, illustrate diagrammatically by way of example one form of embodiment of the invention consisting of an electronic adjustment device for controlling a power press having a clutch of the rotary pin type. In the drawings.

Figure 1:
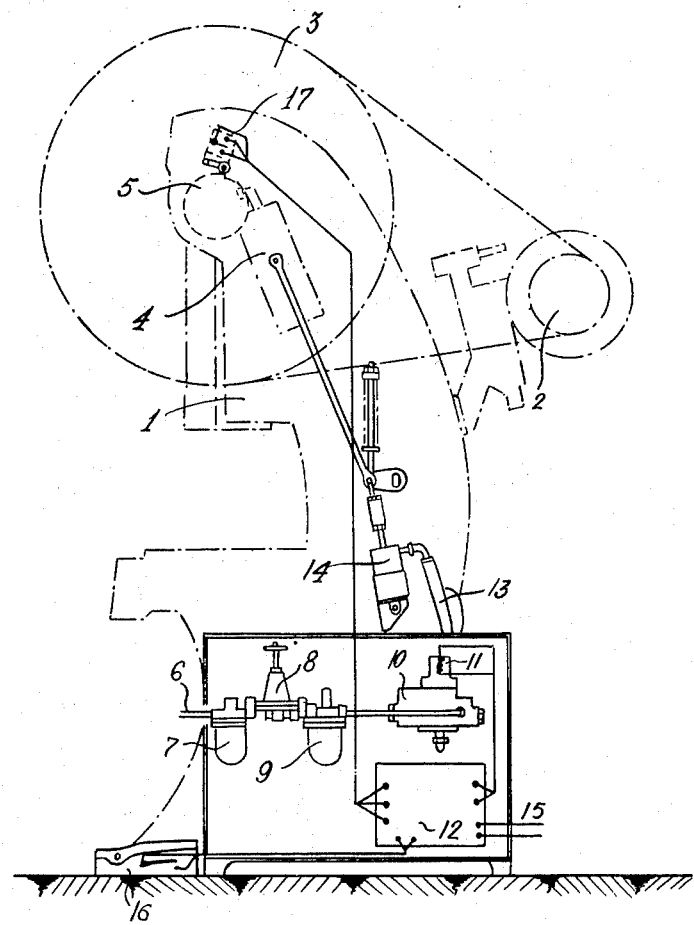
Figure 1 is a diagrammatical view of the press (shown in dot and dash lines) and of the essential components of the adjustment device with the timing arrangement associated therewith.

Referring to Fig. 1, this figure illustrates in side elevational and diagrammatical view of power press 1 driven by a motor 2 and equipped with a flywheel 3, a clutch control device 4 and a cam 5 secured on the press crankshaft. A source of compressed air (not shown) is connected through a pipe 6 to an air-cleaner 7, a pressure-reducing valve 8, an oiling device 9 and a solenoid-operated-valve 10 having its coil 11 connected to a timing arrangement shown in block form at 12. The solenoid-operated valve 10 is adapted, in its open condition, to supply compressed air through a pipe 13 to a pneumatic cylinder 14 in which a piston (not shown) is reciprocated and operatively connected through link means to the press clutch for controlling same. The timing arrangement 12 is connected electrically to the terminals 15 of the mains supply, to a control pedal 16 disposed within easy reach of the operator, to the winding 11 of the solenoid-operated valve 10 and to a reversing switch 17 acuated by the cam 5.

The wiring diagram of this arrangement is shown in

Figure 2:
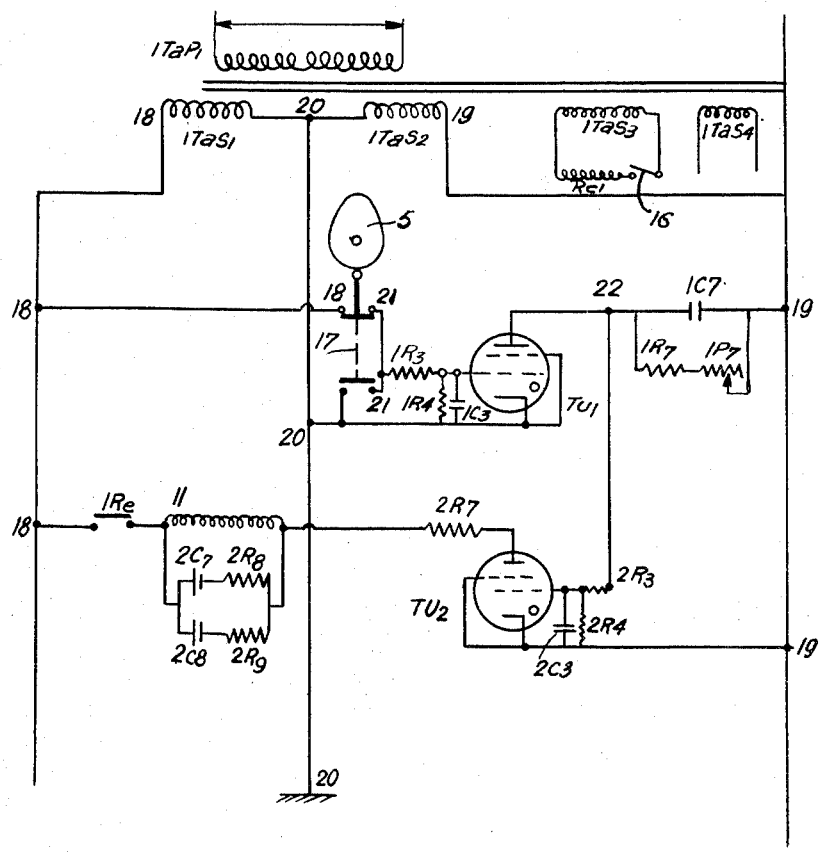
Figure 2 is a circuit diagram of one form of embodiment of the timing arrangement.

Fig. 2 of the drawings. The mains supply is adapted to feed a transformer having a primary winding 1TaP1 and four secondary windings 1TaS1, 1TaS2, 1TaS3 and 1TaS4. A 110-volt voltage may be provided for example across the terminals of each secondary 1TaS1 and 1TaS2.

The secondary 1TaS3 supplies a 24-volt voltage; for example, to a circuit comprising the relay Re1 and the control pedal 16 of the operator. The last secondary 1TaS4 of the transformer provides a 6.3-volt voltage, for example, for heating the filaments (not shown) of the electron tubes of the timing arrangement. The terminals designated by the reference numerals 18 and 19 correspond to the end terminals of the secondary windings 1TaS1 and 1TaS2 of which the common terminal 20 is grounded.

The cathode of the thyratron tube TU1 is connected to the intermediate terminal 20 and its anode to the terminal 19. The grid circuit of tube TU1 comprises the limiting resistor 1R3 and the polarity reversing switch 17 of which the contact-carrying blades are adapted, under the control of cam 5, to connect either points 18 and 21 or points 20 and 21. A resistor 1R4 and a de-coupling capacitor 1C3 in parallel are connected across the cathode and grid circuits of tube TU1.

The anode circuit of this tube includes a capacitor 1C7, a resistor 1R7 and a variable resistor or adjustable potentiometer 1P7. The anode circuit is connected through the terminal 22 to the grid circuit of the thyratron tube TU2 across a limiting resistor 2R3. The cathode circuit of tube TU2 is connected to the terminal 19. A resistor 2R4 and a de-coupling capacitor 2C3 are connected between the cathode and grid circuits of tube TU2.

The anode circuit of this tube comprises a resistor 2R7, the winding of the solenoid-operated valve 11, the contact 1Re controlled by relay Re1 and the parallel-connected resistor 2R8, 2R9 and capacitors 2C7, 2C8.

The timing arrangement described hereinabove operates as follows: In the starting position, the reversing switch 17 connects points 18 and 21. Thus, the grid of tube TU1 is negative with respect to its cathode and the tube is non-conducting. As the grid of tube TU2 has the same voltage as its cathode, this tube would be conducting if the contact 1Re were closed.

When the operator depresses the pedal 16, the relay Re1 is energized and closes the contact 1Re. The tube TU2 is conducting and the coil 11 energized. Consequently, the valve 10 is opened and compressed air admitted into the pneumatic cylinder 14 to cause the clutch control device 4 to operate the clutch proper.

The actuation of the crank-and-rod mechanism of the press causes the cam 5 to rotate and as a result the position of the contact blades of the reversing switch 17 are reversed, thereby connecting the terminals 20 and 21. As the cathode and grid of tube TU1 are fed with the same voltage, this tube becomes conducting, charges the capacitor 1C7 and blocks the tube TU2 by modifying the grid voltage thereof.

The blocking of tube TU2 results in the deenergizing of the electro-valve coil 11 but the clutch of the press remains engaged until the slide block of the press has executed a complete forward and return stroke, the connecting rod and crank mechanism being then automatically disengaged. As cam 5 follows the movement of this mechanism, contact 17 will be reversed and thus in a position to connect points 18 and 21 when the mechanism is disengaged and the press stopped. The tube TU1 resumes its non-conducting condition but the other tube TU2 does not become conducting until the capacitor 1C7 is discharged. When tube TU1 becomes non-conducting, the capacitor 1C7 gradually discharges by leakage and through the resistor 1R7 and the potentiometer 1P7. The capacitor discharge time corresponds to the interval between two strokes of the press and is adjustable by means of the potentiometer 1P7.

When the capacitor 1C7 is discharged, tube TU2 again becomes conducting, the winding of the solenoid-operated valve 11 re-energized and a new cycle of operation begins. Therefore, the press will be released for operation at regular intervals and as long as the operator keeps the pedal 16 depressed.

Figure 3:
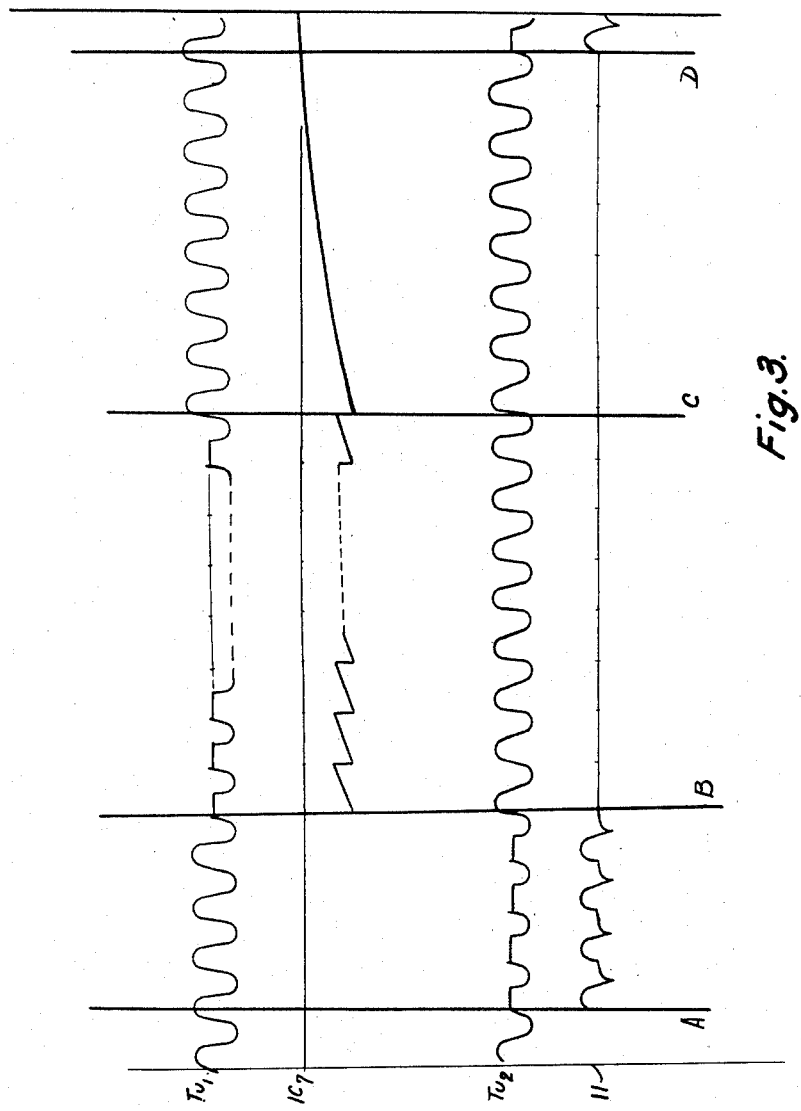
Figure 3 is a graph showing the mode of operation of the component elements of the timing arrangement.

The mode of operation of the various components of the timing arrangements is shown in diagram form in Fig. 3. The time is plotted in abscissa and when the pedal is depressed (at A) by the operator, the relay Re1 is energized and closes its contact 1Re, whereby the tube TU2 becomes conducting and the winding of the solenoid-operated valve 11 is energized.

At B, when the contacts of switch 17 have been reversed by the rotating cam 5, tube TU1 is conducting and blocks the other tube TU2, so that the winding of the solenoid-operated valve 11 is de-energized. The capacitor 1C7 is charged and when the tube TU1 becomes non-conducting at C the capacitor 1C7 gradually discharges and keeps the tube TU2 block until this capacitor 1C7 is fully discharged. The tube TU2 is thereupon restored to its conducting condition at D and another cycle of operations, identical with the former, is initiated.

Of course the adjustment device for regulating the rate of operation of the power press which is described hereinabove should not be construed as limiting the invention to this purely exemplary form of embodiment, as many modifications may be brought thereto without departing from the spirit and scope of the invention as set forth in the appended claims.

Thus, notably, the voltage values will be selected for each specific application in accordance with the characteristics of the electronic devices employed, these devices being themselves selected suit the consumption of energy by the winding of the solenoid-operated valve. Again, the control device may be operated by a fluid other than compressed air.

It will be readily understood by anybody conversant with the art than the arrangement provided by this invention is not limited to the control of power presses, slide-shears, etc. as it can be combined with any other mechanism of machine driven by equivalent means.

I claim:

1. An adjustment device for controlling the operation in predetermined spaced cycles of a clutch connecting a driven member to a continuously operating driving member, which comprises electrically controlled means for initiating the engagement of said clutch, switch means actuated by said driven member, a first electron tube having an anode, control grid and cathode, means connecting said control grid to said switch, said switch being operable to render said tube non-conducting at the beginning of a cycle and to render said tube conducting during a predetermined intermediate portion of the cycle, a capacitor in the anode circuit of said tube and a variable resistor connected in series with said capacitor, a second electron tube having an anode, control grid and cathode, means connecting the cathode and control grid of said second tube to opposite sides of said capacitor, and means connecting said electrically controlled means in the anode circuit of said second tube so as to cause engagement of the clutch when said second tube is conducting, said second tube being rendered non-conducting by the charging of said capacitor by said first tube and becoming conducting when said capacitor has become discharged, the rate of discharge of said capacitor and hence the time between successive cycles being variable by the adjustment of said resistor.

2. An adjustment device according to claim 1, in which said switch means comprises a cam-operated polarity-reversing switch.

3. An adjusting device according to claim 1, in which the anode circuit of said second tube further comprises an operator-controlled switch connected in series with said electrically controlled means.

4. In apparatus for controlling the operation in predetermined spaced cycles of a clutch connecting an intermittently operable driven member to a continuously operating driving member, electrically controlled means for initiating engagement of said clutch, switch means actuated by said driven means, an electron tube having an anode, control grid and cathode, a condenser connected between the cathode and control grid of said tube, a variable resistor connected in parallel with said capacitor, means controlled by said switch for charging said capacitor at a predetermined time in the cycle of operation of said driven member after the beginning and before the end of said cycle, and means connecting said electrically controlled means in the anode circuit of said tube so as to cause engagement of said clutch when said tube is conducting, said tube being conducting at the beginning of a cycle, being rendered non-conducting by the charging of said capacitor and again becoming conducting when said capacitor has become discharged, the rate of discharge of said capacitor and hence the time interval between successive cycles being variable by the adjustment of said resistor.

References Cited in the file of this patent

UNITED STATES PATENTS

| | | |
|---|---|---|
| 2,577,882 | Foster | Dec. 11, 1951 |
| 2,636,138 | Few et al. | Apr. 21, 1953 |
| 2,675,507 | Geiger | Apr. 13, 1954 |